United States Patent

[11] 3,631,276

[72] Inventor: Max Hetzel, Bienne, Switzerland
[21] Appl. No.: 882,818
[22] Filed: Dec. 8, 1969
[45] Patented: Dec. 28, 1971
[73] Assignee: Centre Electronique Horloger S.A., Brequet-Neuchatel, Switzerland
[32] Priority: Dec. 19, 1968
[33] Switzerland
[31] 18896/68

[54] MECHANICAL RESONATOR FOR TIME-MEASURING APPARATUS
5 Claims, 3 Drawing Figs.

[52] U.S. Cl. ..................................... 310/25, 58/23
[51] Int. Cl. ..................................... H02k 33/00
[50] Field of Search ..................................... 58/23, 23 TF; 310/25, 19; 331/116, 154, 156

[56] References Cited
UNITED STATES PATENTS

| | | | |
|---|---|---|---|
| 2,424,724 | 7/1947 | Tolk | 310/25 X |
| 2,849,562 | 8/1958 | Heller | 310/25 X |
| 1,235,579 | 8/1917 | Lincoln | 310/19 X |
| 1,728,135 | 9/1929 | Pillion | 310/19 X |
| 2,847,587 | 8/1958 | Brasseur | 310/19 |
| 2,886,720 | 5/1959 | Buck | 310/19 |
| 3,466,475 | 9/1969 | Hetzel et al. | 58/23 X |

Primary Examiner—D. F. Duggan
Attorney—Stevens, Davis, Miller & Mosher

ABSTRACT: A mechanical resonator for time-measuring apparatus, comprising two branches oscillating in phase opposition and at least one device for the compensation of the variations of the frequency proper of the resonator when the orientation in space of the latter changes, said device comprising a cavity provided in a piece forming part of one of the said branches, and a mass placed in this cavity to move freely in the same, consisting of a viscous liquid filling only a part of the cavity.

MECHANICAL RESONATOR FOR TIME-MEASURING APPARATUS

BACKGROUND OF THE INVENTION

In my earlier U.S. Pat. No. 3,466,475, the mass is constituted by a spherical component a cap of which is removed in order to move the center of gravity out of center in relation to the geometric center of the sphere. This component is placed in a cavity which is also spherical and is filled with a viscous liquid. It has been observed that the spherical component is thus fixed in the chamber against the earth's attraction when it is surrounded by a layer of lubricant. The presence of this layer is motivated on the other hand by the fact the compensation is only brought on by very small displacements of mass, which would be prevented by very weak resistances to friction. It has also been proposed to place a small ball in a larger chamber, the remainder of which is filled with oil. In this case, the ball either does not move to effect a compensation of the position error, or it is kept moving by the constantly changing accelerations of the normal movement of oscillation of the oil, which reduces the quality factor of the resonator. The same has been experienced with mercury as compensating mass.

OBJECT OF THE INVENTION

It is an object of this invention to avoid the drawbacks of the resonator mentioned above, and to provide a resonator with a compensating mass which is easy to handle and to place in said cavity.

BROAD DEFINITION OF THE INVENTION

According to the invention, the resonator of the kind described has a compensating mass consisting of a viscous liquid filling a part only of said cavity.

This compensating mass subjected to the acceleration of the normal oscillations of the resonator brings no relative motion in the direction of the oscillations, in relation to the oscillating arm. The compensating mass moves perpendicularly to the oscillating motion under the influence of the force of attraction of the earth in the sense of a compensation of the position error.

The accompanying drawing illustrates, by way of examples, an embodiment and a variant of the resonator of the present invention.

Figure 1:
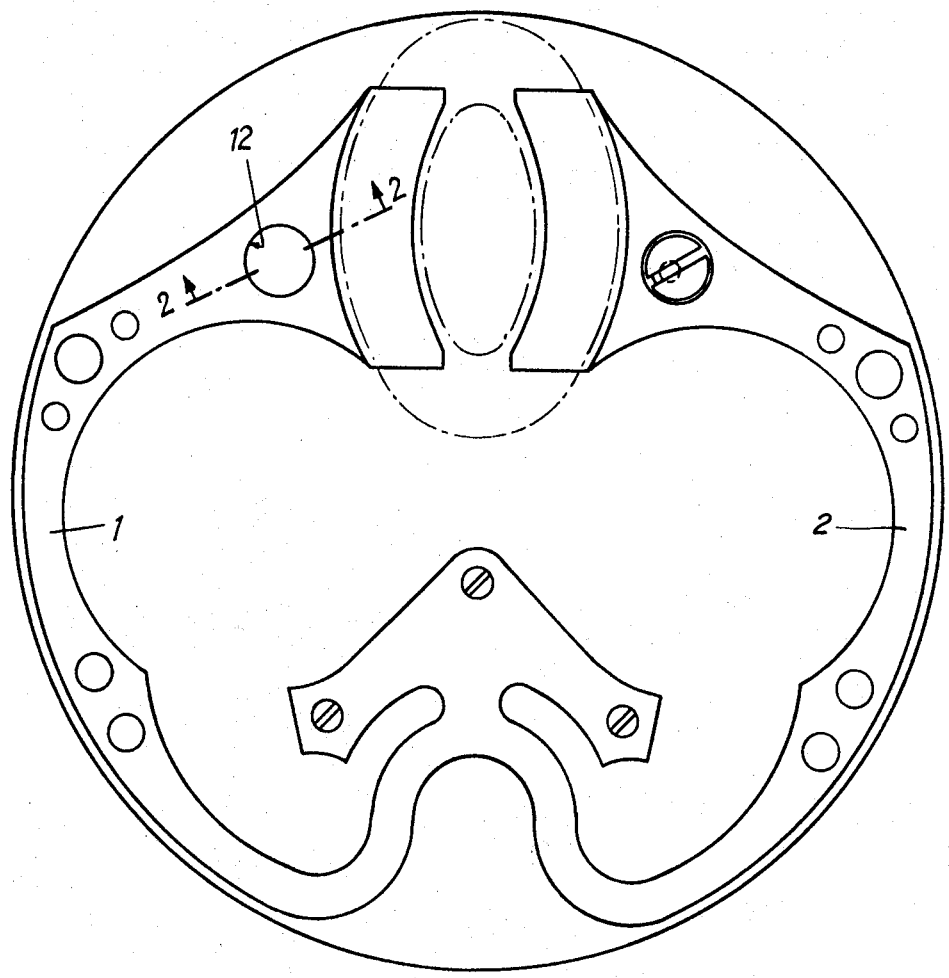
FIG. 1 is a plane view of the same.

The resonator of FIG. 1 is identical with the one described in the principal patent, and comprises two branches 1 and 2. The branch 1 is similarly provided with a recess 12 adapted to receive a device automatically compensating the error of position.

Figure 2:
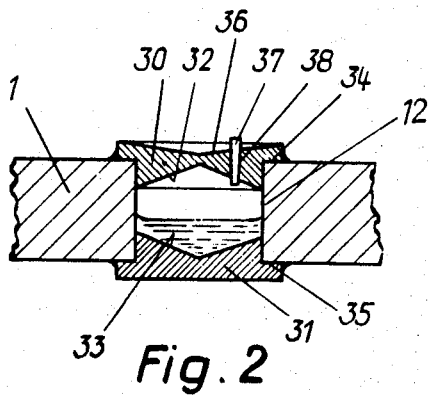
FIG. 2 is a section taken along a line 2—2 of FIG. 1.

FIG. 2 shows the compensating device in an enlarged view. This latter comprises two stoppers 30 and 31, having conical interior surfaces 32 and 33 respectively, inserted in the two extremities of the recess 12.

These stoppers are secured in the recess 12 by means of an epoxy resin such as Araldite (trade mark) which at the same time ensures the fluidtightness of the cavity. Each of these stoppers 30 and 31 is positioned by means of a respective shoulder 34 and 35 resting on one of the plane faces of the branch 1 of the resonator. The outer surface 36 of the stopper 30 is conical and forms a funnel. This stopper 30 is pierced by a filling orifice 38 which is hermetically sealed after filling by means of a pin 37, also secured by an epoxy resin.

The interior of the cavity thus obtained is partially filled with a liquid having a viscosity situated between 300 and 10,000 Centistokes, preferably of 1,000 Centistokes, constituting the compensating mass which fills about one-tenth to three-fourths of the cavity, preferably less than half of the latter. A polymer of dimethylsiloxane constitutes a particularly suitable compensating liquid, this polymer being also known under the name of silicon oil and by the commercial denomination "Dow Corning 200." This liquid has a viscosity-temperature curve which is relatively flat between −40° and 200° C. and its properties do not alter with age. The viscosity of silicone oil principally depends on the degree of polymerization.

Figure 3:
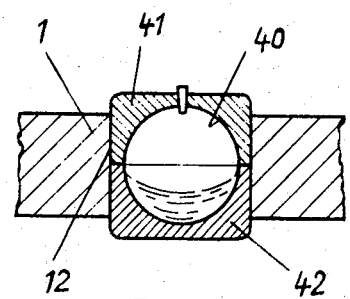
FIG. 3 is a view similar to that of FIG. 2 showing a variant.

The embodiment illustrated in FIG. 3 represents the ideal form of cavity, constituted by a spherical cavity 40 formed by two separate components 41 and 42 inserted in the recess 12. This embodiment, however, is too costly for practical manufacture and the embodiment illustrated in FIG. 2 is to be preferred.

In the two embodiments the remaining free space of the cavity may be filled with a gas, for instance air, but it is also possible to evacuate the cavity to form a vacuum before the filling orifice 38 is sealed off.

In practice, the cavity may be filled by placing the viscous liquid on the outer conical surface 36 of the stopper while covering the filling orifice 38. The cavity is then heated to cause the air to be driven out through the orifice 38, after which the cavity is allowed to cool. The pressure then obtaining in the cavity being below atmospheric pressure, the viscous liquid is drawn into this cavity. When the liquid has been placed in the cavity, the latter may be sealed as previously described, but it is also possible to create a vacuum in the remaining space of the cavity before it is hermetically sealed off.

I claim:

1. A mechanical resonator for time-measuring apparatus having two branches oscillating in phase opposition, comprising means for compensating variations in frequency of said resonator when the orientation thereof in space changes, said compensating means consisting of a cavity filled to between one-tenth and three-fourths of its volume with a viscous fluid provided in a portion of at least one of said branches.

2. Resonator according to claim 1, wherein the cavity is under a vacuum.

3. Resonator according to claim 1, wherein the viscosity of said liquid is between 300 Centistokes and 10,000 Centistokes.

4. Resonator according to claim 1, wherein the viscous liquid wets the surfaces of the cavity.

5. Resonator according to claim 1, wherein the liquid is a polymer of dimethylsiloxane.

* * * * *